(12) United States Patent
Singh et al.

(10) Patent No.: US 9,468,039 B1
(45) Date of Patent: Oct. 11, 2016

(54) METHOD AND SYSTEM FOR PAGING A MULTI-MODE MOBILE STATION

(75) Inventors: Jasinder P. Singh, Olathe, KS (US); Sachin R. Vargantwar, Overland Park, KS (US); Maulik K. Shah, Overland Park, KS (US); Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 900 days.

(21) Appl. No.: 12/959,244

(22) Filed: Dec. 2, 2010

(51) Int. Cl.
H04B 7/216 (2006.01)
H04W 88/06 (2009.01)
H04W 88/10 (2009.01)

(52) U.S. Cl.
CPC ............. *H04W 88/06* (2013.01); *H04W 88/10* (2013.01)

(58) Field of Classification Search
None
See application file for complete search history.

(56) References Cited

U.S. PATENT DOCUMENTS

| | | | |
|---|---|---|---|
| 6,307,846 B1 | 10/2001 | Willey | |
| 7,436,791 B2 | 10/2008 | Willey et al. | |
| 7,486,637 B2 | 2/2009 | Goldberg | |
| 8,169,968 B1* | 5/2012 | Stegall et al. | 370/331 |
| 2005/0085253 A1 | 4/2005 | Mansour | |
| 2005/0141464 A1 | 6/2005 | Willey et al. | |
| 2005/0174970 A1* | 8/2005 | Krishnamurthi et al. | 370/335 |
| 2006/0040681 A1 | 2/2006 | Julka et al. | |
| 2007/0142071 A1* | 6/2007 | Hart et al. | 455/518 |
| 2007/0281710 A1* | 12/2007 | Bai et al. | 455/452.1 |
| 2011/0096706 A1* | 4/2011 | Ramasamy et al. | 370/310 |
| 2012/0275448 A1* | 11/2012 | Chin et al. | 370/342 |

* cited by examiner

*Primary Examiner* — Jae Y Lee
*Assistant Examiner* — Thinh Tran

(57) ABSTRACT

A multi-mode mobile station is able to communicate with a first system using a first air interface protocol (e.g., EVDO) and with a second system using a second air interface protocol (e.g., 1xRTT CDMA). When the first system schedules a page message for transmission to the multi-mode mobile station, the first system may query the second system to determine whether the second air interface protocol is being used for a current call involving the multi-mode mobile station or is being used to attempt establishment of a requested call to the multi-mode mobile station. In the case of a current call, the first system may wait until the call is released before transmitting the page message. In the case of an attempt to establish a requested call, the first system may wait to determine whether the attempt is successful before transmitting the page message.

17 Claims, 2 Drawing Sheets

METHOD AND SYSTEM FOR PAGING A MULTI-MODE MOBILE STATION

BACKGROUND

Many mobile stations are able to communicate using multiple air interface protocols. For example, a multi-mode mobile station may be able to communicate using a first air interface protocol and a second air interface protocol. The first air interface protocol could be a high data rate protocol, such as EVDO, which the multi-mode mobile station may use for 3G wireless service. The second air interface protocol could be a legacy protocol, such as 1×RTT CDMA, which the multi-mode mobile station may use in areas where 3G service is unavailable.

By being able to use multiple air interface protocols, a multi-mode mobile station may be able to provide improved service to the user. However, the support of multiple air interface air interface protocols can also cause difficulties. For example, a multi-mode mobile station might be paged using any of the air interface protocols that it supports. In order to save battery life, a multi-mode mobile station may listen for page messages in accordance with a schedule, such as a slot cycle index, for each air interface protocol that it supports. Thus, a multi-mode mobile station may listen for page messages that use a first air interface protocol in accordance with a first schedule and may list for page messages that use a second air interface protocol in accordance with a second schedule.

However, the first and second schedules may conflict. For example, the first and second air interface protocols may be used to transmit page messages to the multi-mode mobile station at about the same time. When that occurs, the multi-mode mobile station might receive only one of the page messages (e.g., the page message transmitted via the second air interface protocol) and miss the other page message (e.g., the page message transmitted via the first air interface protocol). Accordingly, there is a need to better coordinate the use of multiple air interface protocols in the transmission of page messages to multi-mode mobile stations.

Overview

In a first principal aspect, an exemplary embodiment provides a method for a radio access network (RAN) serving a multi-mode mobile station, wherein the multi-mode mobile station is able to communicate using a first air interface protocol and a second air interface protocol. In accordance with the method, the RAN schedules a communication for transmission to the multi-mode mobile station using the first air interface protocol. Before transmitting the communication to the multi-mode mobile station, the RAN determines whether the second air interface protocol is being used for a current call involving the multi-mode mobile station or is being used to attempt establishment of a requested call to the multi-mode mobile station.

In a second principal aspect, an exemplary embodiment provides a method in which: (a) a first system schedules a page message for transmission to a multi-mode mobile station, wherein the first system uses a first air interface protocol, and wherein the multi-mode mobile station is able to communicate using the first air interface protocol and a second air interface protocol; (b) the first system determines whether the multi-mode mobile station is engaged in a current call via the second system, wherein the second system uses the second air interface protocol; (c) in response to a determination that the multi-mode mobile station is engaged in a current call via the second system, the first system defers transmission of the page message; and (d) in response to a determination that the multi-mode mobile station is not engaged in a current call via the second system, the first system determines whether the second system is attempting establishment of a requested call to the multi-mode mobile station.

In a third principal aspect, an exemplary embodiment provides a radio access network (RAN) comprising: a first system for communicating with mobile stations using a first air interface protocol; and a second system for communicating with mobile stations using a second air interface. The first system is configured to (i) schedule a communication for transmission to a multi-mode mobile station using the first air interface protocol, wherein the multi-mode mobile station is able to communicate using the first air interface protocol and a second air interface protocol, and (ii) before transmitting the communication to the multi-mode mobile station, query the second system to determine whether the second system is being used for a current call involving the multi-mode mobile station or is being used to attempt establishment of a requested call to the multi-mode mobile station.

DETAILED DESCRIPTION OF EXEMPLARY EMBODIMENTS

1. Introduction

Figure 1:
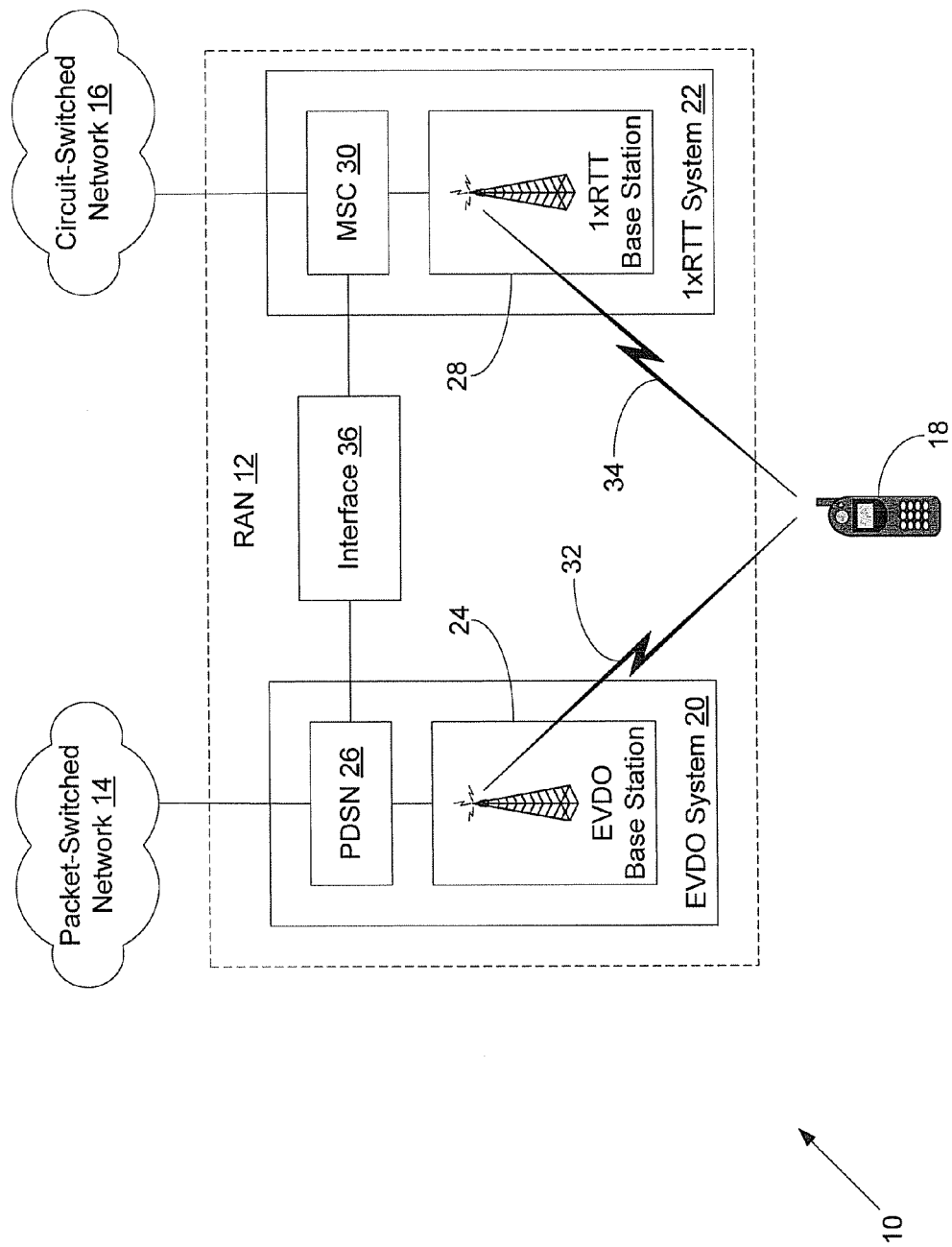
FIG. 1 is a block diagram of a wireless telecommunications system, in accordance with an exemplary embodiment.

Described herein are methods and systems for coordinating the use of multiple air interface protocols to transmit communications (e.g., page messages) to a multi-mode mobile station. In one example, the multi-mode mobile station is able to communicate with a first system using a first air interface protocol and is also able to communicate with a second system using a second air interface protocol. When the first system schedules a communication, such as a page message, for transmission to the multi-mode mobile station, the first system may determine (e.g., by querying the second system) whether the second air interface protocol is being used for a current call involving the multi-mode mobile station or is being used to attempt establishment of a requested call to the multi-mode mobile station.

The first system may determine that the multi-mode mobile station is involved in a current call via the second system, for example, by determining that the second system has assigned a traffic channel to the multi-mode mobile station. In that case, the first system may defer or cancel transmission of the communication. In particular, the first system may wait until the call is released before transmitting the communication to the multi-mode mobile station. However, a time limit may be imposed on this waiting period. If the first system is still involved in the call when the time limit is reached, the first system may cancel the communication.

Even if the multi-mode mobile station is not involved in a current call via the second system, the first system may determine that the second system is being used to attempt establishment of a requested call to the multi-mode mobile station. For example, the first system may determine that the second system has already transmitted a page message and is waiting for the multi-mode mobile station to answer, or the first system may determine that the second system has a page message that is scheduled for transmission to the multi-mode mobile station. In that case, the first system may wait to determine whether the requested call is successfully established before transmitting the communication to the multi-mode mobile station. If the requested call to the multi-mode mobile station is successfully established, the first system may defer transmission of the communication (e.g., defer transmission of the communication until the newly-established call is released) or may simply cancel the communication. On the other hand, if the requested call is not successfully established, then the first system may transmit the communication in the next available time slot.

Thus, a first system that uses a first air interface protocol may coordinate its communications to a multi-mobile station based on how a second system that uses a second air interface protocol is communicating with the multi-mode mobile station. In this way, the potential for conflicts between attempts to communicate with the multi-mode mobile station using different air interface protocols may be beneficially reduced.

2. Exemplary Network Architecture

FIG. 1 illustrates a wireless telecommunications system 10 in which exemplary embodiments may be employed. Wireless telecommunications system 10 includes a radio access network (RAN) 12, which is communicatively coupled to a packet-switched network 14 and a circuit-switched network 16. Packet-switched network 14 may include, for example, the Internet. Circuit-switched network 16 may include, for example, the public switched telephone network (PSTN).

RAN 12 is able to wirelessly communicate with mobile devices via a plurality of air interface protocols. The air interface protocols supported by RAN 12 may include 1×RTT CDMA, EVDO, IEEE 802.11 (Wife), IEEE 802.16 (WiMAX), GSM/GPRS, LTE, and/or any other protocol for wirelessly communicating with mobile devices. Some of the mobile devices in communication with RAN 12 may be able to communicate with only one of the air interfaces supported by RAN 12. Other mobile devices in communication with RAN 12 may be multi-mode mobile devices that are able to communicate using more than one of the air interface protocols supported by RAN 12. Such multi-mode devices are exemplified in FIG. 1 by multi-mode mobile station 18. Multi-mode mobile station 18 could be, for example, a wireless telephone, a wireless handheld computer, a wirelessly-equipped laptop computer, or other wireless communication device.

In the example illustrated in FIG. 1, RAN 12 includes an EVDO system 20 for wirelessly communicating with mobile devices using EVDO and a 1×RTT system 22 for wirelessly communicating with mobile devices using 1×RTT CDMA. It is to be understood, however, that this configuration is exemplary only, as RAN 12 may include systems for wirelessly communicating with mobile devices using other or additional air interface protocols.

EVDO system 20 includes one or more base stations, exemplified in FIG. 1 by EVDO base station 24. EVDO base station 24 may communicate with one or more mobile devices, such as multi-mode mobile station 18, within a wireless coverage area. EVDO system 20 may also include one or more elements, such as a packet data serving node (PDSN) 26, that provide access to packet-switched network 14.

1×RTT system 22 includes one or more base stations, exemplified in FIG. 1 by 1×RTT base station 28. 1×RTT base station 28 may communicate with one or more mobile devices, such as multi-mode mobile station 18, within a wireless coverage area. 1×RTT system 22 may also include one or more elements, such as a mobile switching center (MSC) 30, that provides access to circuit-switched network 16.

The wireless coverage areas provided by EVDO base station 24 and 1×RTT base station 28 could be non-overlapping, partially overlapping, or completely overlapping. In an exemplary embodiment, EVDO base station 24 and 1×RTT base station 28 have wireless coverage areas that are at least partially overlapping. Thus, when multi-mode mobile station 18 is operating in the overlap area, multi-mode mobile station 18 may be able to communicate with EVDO base station 24 via an EVDO air interface 32 and/or with 1×RTT base station 28 via a 1×RTT air interface 34.

The communications over EVDO air interface 32 may involve multi-mode mobile station 18 and one or more endpoints that are communicatively coupled to packet-switched network 14. Such endpoints may include, for example, wireless or wireline voice-over-packet (VoP) communication devices, e-mail servers, instant messaging servers, Web servers, streaming media servers, and/or gaming servers. Thus, the communications over EVDO air interface 32 may include the exchange of voice, data, video, text, or other media.

The communications over 1×RTT air interface 34 may involve multi-mode mobile station 18 and one or more endpoints, such as landline telephones and wireless telephones, that are communicatively coupled to circuit-switched network 16. Thus, the communications over 1×RTT air interface 34 may include, for example, voice calls and text messages.

Within RAN 12, EVDO system 20 and 1×RTT system 22 may be able to communicate with one another via one or more interface systems, exemplified in FIG. 1 by interface 36. As described in more detail below, EVDO system 20 may be able to query 1×RTT system 22 (and vice versa) via interface 36 in order to determine the status of the other system's communications with mobile devices, such as multi-mobile station 18. Interface 36 may also allow systems within RAN 12 to access different types of networks. For example, EVDO system 20 may be able to access circuit-switched network 16 via interface 36 and MSC 30, and 1×RTT system 22 may be able to access packet-switched network 14 via interface 36 and PDSN 26.

3. Exemplary Method

Figure 2:
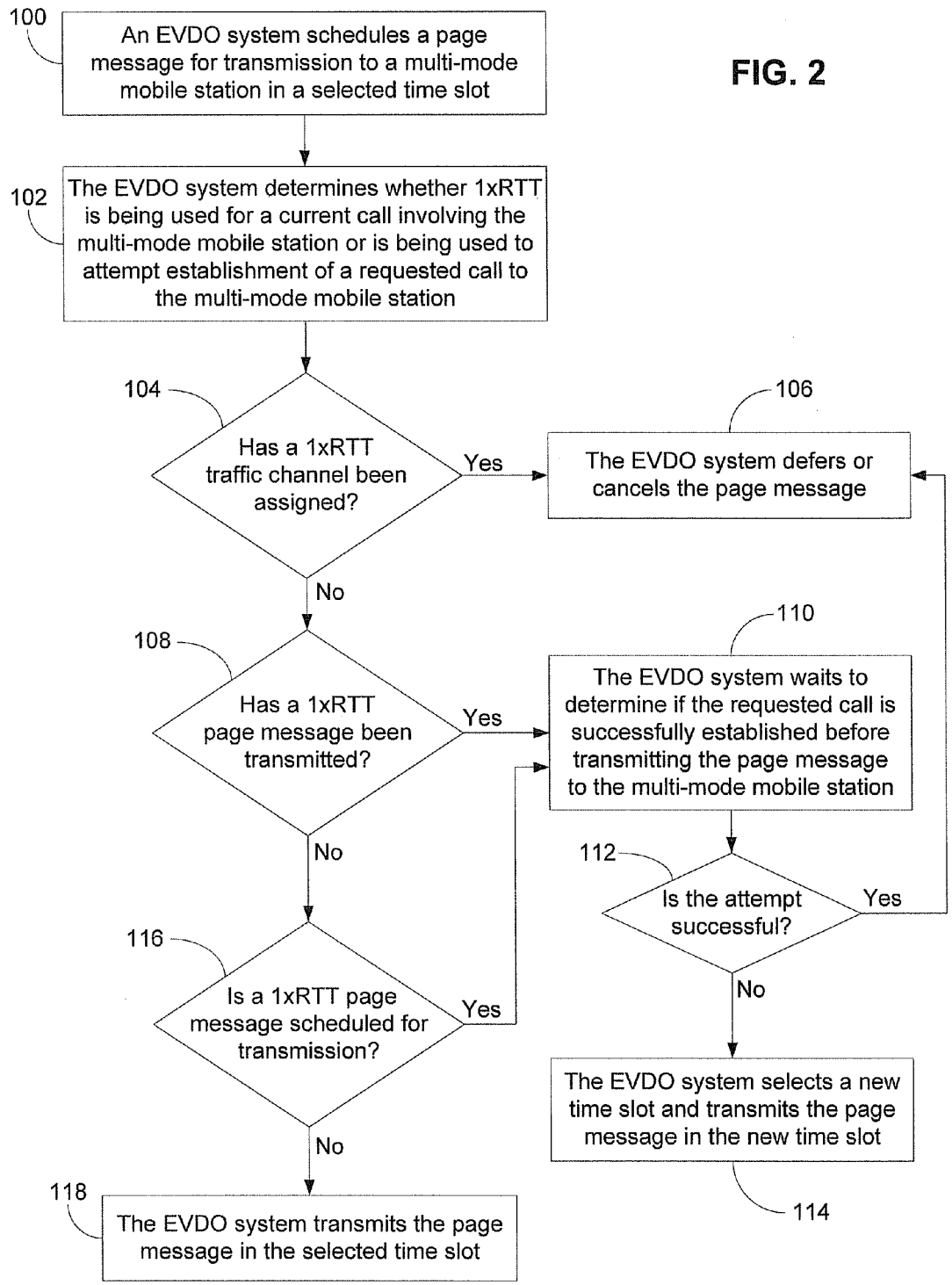
FIG. 2 is a flow chart illustrating a method for paging a multi-mode mobile station, in accordance with an exemplary embodiment.

FIG. 2 is a flow chart illustrating an exemplary method for paging a multi-mode mobile station. For purposes of illustration, the method of FIG. 2 is described with reference to wireless telecommunications system 10 and assumes that the multi-mode mobile station is able to communicate using EVDO and 1×RTT CDMA. It is to be understood, however, that other network architectures and/or other air interface protocols could be used.

As indicated by block 100, the method may begin when an EVDO system (e.g., EVDO system 20) schedules a page message for transmission to a multi-mode mobile station (e.g., multi-mode mobile station 18) in a selected time slot. The EVDO system may schedule the page message in response to receiving a request via packet-switched network 14 to establish a communication session with the multi-mode mobile station. The requested communication session could be, for example, a push-to-talk (PTT) session, a voice-over-Internet Protocol (VoIP) telephone call, an instant messaging session, a text messaging session, or other type of communication session. The selected time slot could be a time slot that is known to be monitored by the multi-mode mobile station, e.g., based on the mobile station's slot cycle index.

Before transmitting the page message, the EVDO system may determine whether 1×RTT (the other air interface protocol supported by the multi-mode mobile station) is being used for a current call involving the multi-mode mobile station or is being used to attempt establishment of a requested call to the multi-mode mobile station, as indicated by block 102. To make this determination, EVDO system 20 may query 1×RTT system 22 via interface 36. In response, 1×RTT system 22 may provide information regarding the status of its communications with the multi-mode mobile station. Such status information may indicate whether 1×RTT system 22 has assigned a traffic channel to the multi-mode mobile station, whether the multi-mode mobile station has been paged regarding a requested call, and/or whether a page message is scheduled for transmission to the multi-mode mobile station.

EVDO system 20 may then use the status information from 1×RTT system 22 to determine whether to transmit the page message in the selected time slot, or whether the transmission of the page message should be cancelled or deferred. For example, the EVDO system may determine whether the multi-mode mobile station is involved in a current call via the 1×RTT system based on whether or not a 1×RTT traffic channel has been assigned to the multi-mode mobile station, as indicated by block 104.

If a 1×RTT traffic channel has been assigned, then the EVDO system may defer or cancel the page message, as indicated by block 106. In an exemplary embodiment, the EVDO waits (up to a predetermined time limit) until the current call is released. When the call has been released (and the time limit has not been exceeded), the EVDO system may select a new time slot and transmit the page message in the newly-selected time slot. In this way, the EVDO system may defer an EVDO page message so as not to conflict with a current call that uses a different air interface protocol (1×RTT CDMA). However, if the time limit is reached before the current call is released, then the EVDO system may cancel the page message. The time limit could be set, for example, depending on the type of requested communication session. For example, the time limit may be relatively short for a PTT communication session or other type of latency-intolerant communication session. On the other hand, the time limit may be higher for communication sessions that are more tolerant of latency, such as text messaging sessions. In some cases, the EVDO system may not impose any time limit at all.

If a 1×RTT traffic channel has not been assigned to the multi-mode mobile station (i.e., the multi-mode mobile station is not involved in a current call via the 1×RTT system), the EVDO system may determine whether 1×RTT is being used to attempt establishment of a requested call by determining whether the 1×RTT system has transmitted a page message to the multi-mode mobile station, as indicated by block 108. If a 1×RTT page message has been transmitted to the multi-mode mobile station about a requested call, then the EVDO system may wait to determine if the requested call is successfully established before transmitting the EVDO page message, as indicated by block 110. The requested call could be, for example, be a request to connect an incoming voice call that 1×RTT system 22 receives via circuit-switched network 16.

Whether the EVDO system proceeds with the page message may depend on whether the attempt to establish the requested call is successful, as indicated by 112. If the attempt is successful (i.e., the requested call is successfully established to the multi-mode mobile station), then the EVDO system may either defer or cancel the page message, as indicated by block 106. In an exemplary embodiment, the EVDO system waits until the newly-established call is released before transmitting the page message. However, if the newly-established call is not released within a predetermined time limit, the EVDO system may cancel the page message. Alternatively, the EVDO system may simply cancel the page message if the requested call is successfully established.

If the attempt to establish the requested call to the multi-mode mobile station is not successful (for example, because the multi-mode mobile station does not answer the 1×RTT page message), the EVDO system may select a new time slot and then transmit the EVDO page message in the new time slot, as indicated by block 114. The new time slot could be, for example, the next available time slot that would be monitored by the multi-mode mobile station.

Even if a 1×RTT page message has not already been transmitted to the multi-mode mobile station, the EVDO system may check whether a 1×RTT page is scheduled for transmission to the multi-mode mobile station, as indicated by block 116. In this regard, a 1×RTT page message might be scheduled for transmission in a time slot that conflicts with the time slot selected for the EVDO page message. In that case, the EVDO system may wait to determine whether the requested call is successfully established before transmitting the page message to the multi-mode mobile station, as indicated by block 110.

In the case that 1×RTT is not being used for a current call involving the multi-mode mobile station and is not being used to attempt establishment of a requested call to the multi-mode mobile station (e.g., as indicated by a 1×RTT page message having been already been transmitted to the multi-mode mobile station or having been scheduled for transmission to the multi-mode mobile station), then the EVDO system may transmit the page message in the selected time slot, as indicated by block 118.

In this way, the EVDO system may schedule transmission of an EVDO page message to a multi-mode mobile station (or may cancel transmission of an EVDO page message) so as not to conflict with 1×RTT communications with the multi-mode mobile station.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for a radio access network (RAN) serving a multi-mode mobile station, wherein said multi-mode mobile station is able to communicate using a first air interface protocol and a second air interface protocol, said method comprising:

said RAN selecting, based on a slot cycle index of said multi-mode mobile station, a first time slot for transmission of a communication to said multi-mode mobile station using said first air interface protocol; and after selecting said first time slot, said RAN making a determination that said second air interface protocol is being used for a current call involving said multi-mode mobile station or is being used to attempt establishment of a requested call to said multi-mode mobile station;

after making said determination, said RAN determining a disposition of said current or requested call;

after determining said disposition of said current or requested call, said RAN selecting a second time slot; and said RAN transmitting said communication in said second time slot to said multi-mode mobile station using said first air interface protocol.

2. The method of claim 1, wherein said first air interface protocol is EVDO and said second air interface protocol is 1×RTT CDMA.

3. The method of claim 1, wherein said communication is a page message.

4. The method of claim 1, wherein:

said RAN making a determination that said second air interface protocol is being used for a current call involving said multi-mode mobile station or is being used to attempt establishment of a requested call to said multi-mode mobile station comprises said RAN determining that said second air interface protocol is being used for a current call involving said multi-mode mobile station; and said RAN determining a disposition of said current or requested call comprises said RAN determining that said current call involving said multi-mode mobile station has been released.

5. The method of claim 4, wherein said RAN determining that said second air interface protocol is being used for a current call involving said multi-mode mobile station comprises:

said RAN determining that a traffic channel used by said second air interface protocol has been assigned to said multi-mode mobile station.

6. The method of claim 1, wherein:

said RAN making a determination that said second air interface protocol is being used for a current call involving said multi-mode mobile station or is being used to attempt establishment of a requested call to said multi-mode mobile station comprises said RAN determining that said second air interface protocol is being used to attempt establishment of a requested call to said multi-mode mobile station; and said RAN determining a disposition of said current or requested call comprises said RAN determining that said requested call was not successfully established to said multi-mode mobile station.

7. The method of claim 6, wherein said RAN determining that said second air interface protocol is being used to attempt establishment of a requested call to said multi-mode mobile station comprises:

said RAN determining that said second air interface protocol is being used to page said multi-mode mobile station regarding said requested call.

8. A method comprising:

a first system selecting a first time slot for transmission of a page message to a multi-mode mobile station, wherein said first system uses a first air interface protocol, wherein said multi-mode mobile station is able to communicate using said first air interface protocol and a second air interface protocol, and wherein said time slot is selected based on a slot cycle index of said mobile station;

said first system obtaining status information from a second system, wherein said second system uses a second air interface protocol, and wherein said status information indicates that second air interface protocol is being used for a current call involving said multi-mode mobile station or is being used to attempt establishment of a requested call to said multi-mode mobile station;

after selecting said first time slot and obtaining said status information, said first system obtaining additional status information from said second system, wherein said additional status information indicates a disposition of said current or requested call;

after obtaining said additional status information from said second system, said first system selecting a second time slot; and said first system transmitting said communication in said second time slot to said multi-mode mobile station using said first air interface protocol.

9. The method of claim 8, further comprising:

said first system determining from said status information that said multi-mode mobile station is involved in a current call via said second system; and said first system determining from said additional status information that said current call involving said multi-mode mobile station has been released.

10. The method of claim 8, further comprising:

said first system determining from said status information that said second system is attempting establishment of a requested call to said multi-mode mobile station; and said first system determining from said additional status information that said requested call was not successfully established to said multi-mode mobile station.

11. The method of claim 8, wherein said first system comprises a first base station and said second system comprises a second base station.

12. The method of claim 8, wherein said first air interface protocol is EVDO and said second air interface protocol is 1×RTT CDMA.

13. A radio access network (RAN), comprising:

a first system for communicating with mobile stations using a first air interface protocol, said first system comprising a first base station; and a second system for communicating with mobile stations using a second air interface protocol, said second system comprising a second base station, wherein said first system is configured to (i) select a first time slot for transmission of a page message to a multi-mode mobile station using said first air interface protocol, wherein said multi-mode mobile station is able to communicate using said first air interface protocol and a second air interface protocol, (ii) obtain status information from said second system, wherein said status information indicates that said second air interface protocol is being used for a current call involving said multi-mode mobile station or is being used to attempt establishment of a requested call to said multi-mode mobile station, (iii) after selecting said first time slot and obtaining said status information, obtain additional status information from said second system, wherein said additional status information indicates a disposition of said current or requested call, (iv) after obtaining said additional status information from said second system, select a second time slot, and (v) transmit said communication in said second time slot to said multi-mode mobile station using said first air interface protocol.

14. The RAN of claim 13, wherein said first base station is an EVDO base station and second base station is a 1×RTT base station.

15. The RAN of claim 13, wherein said first system is communicatively coupled to a packet-switched network and said second system is communicatively coupled to a circuit-switched network.

16. The RAN of claim 13, wherein:
said status information indicates that said multi-mode mobile station is involved in a current call via said second system; and
said additional status information indicates that said current call involving said multi-mode mobile station has been released.

17. The RAN of claim 13, wherein:
said status information indicates that said second system is attempting establishment of a requested call to said multi-mode mobile station; and
said additional status information indicates that said requested call was not successfully established to said multi-mode mobile station.

* * * * *